United States Patent Office 3,508,940
Patented Apr. 28, 1970

3,508,940
LIGHTWEIGHT REFRACTORY INSULATION AND METHOD OF PREPARING THE SAME
James E. Webb, Administrator of the National Aeronautics and Space Administration, with respect to an invention of Hiroshi H. Nakamura, Harold L. Rechter, and Adi J. Mountvala, Chicago, Ill.
No Drawing. Filed Feb. 17, 1967, Ser. No. 617,774
Int. Cl. C04b 21/10, 21/00
U.S. Cl. 106—88                                10 Claims

ABSTRACT OF THE DISCLOSURE

A lightweight refractory insulation composition for use as a rigid heat shield. The composition comprises, in weight percent, zircon, mullite or calcium aluminate, 54 to 75; an alkali metal silicate binder, 6.9 to 8.5; a complexing agent, 1 to 3; refractory fibers, 1.5 to 10; water, 23.9 to 25.7; whipping agent, 0.15 to 1.0 and clay, 0 to 2. This composition is prepared and fabricated by mixing the above ingredients, whipping the mixture to produce a castable foam, applying the foam as a layer on the substrate to be protected and curing by heating to a temperature less than about 260° F. The resulting heat shield exhibits favorable heat-reflecting properties and mechanical integrity sufficient to withstand severe vibration and acceleration forces.

---

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to insulating materials and more particularly to lightweight ceramic foam insulation for rigid heat shields.

The intense radiant heat flux produced by high-thrust rocket engines has created a need for improved insulation. Certain metal surfaces at the base of the rocket launch vehicle must be covered with protective heat shielding in order to maintain the vehicle intact during ignition, lift-off and powered stages of flight. For Saturn vehicle applications the heat shield should provide sufficient insulation to maintain the temperature of the shielded substrate below 400° F. when subjected to a heat flux of 40 B.t.u. per square foot per second for 300 seconds. In order to meet this requirement with a reasonably thin insulating layer the insulation must exhibit a low thermal conductivity and a high reflectance for radiant energy in the wavelength range of 1 to 2.4 microns.

Another requirement for heat shields for large-rocket applications is a high degree of mechanical integrity, the rocket structure being subjected to intense acceleration and vibration forces during lift-off and flight. High strength, low coefficient of thermal expansion, a high resistance to thermal shock and good bonding to the substrate are necessary to maintain the heat shield intact. Other desired properties are a low density, capability for convenient fabrication and resistance to moisture. A relatively low density of 60 pounds per cubic foot or less is desired to avoid unduly decreasing the payload of the rocket. For convenient fabrication the insulating material should be in a form suitable for easy application on the substrate, and it should be curable at a relatively low temperature.

Various refractory insulating compositions such as foamed oxides and asbestos-containing mixtures have been available previously for use in heat shields, but none of these compositions meets all of the criteria given above. Some of the previously available compositions exhibit a high density, while others have low mechanical strength or a cracking tendency, while others require a high-temperature curing cycle or fail to provide the necessary reflectance.

It is therefore an object of this invention to provide an insulating composition that has high reflectance, high strength and relatively low density.

Another object is to provide a refractory insulating composition which can be applied easily to a substrate and cured at a relatively low temperature to form a rigid heat shield.

Another object is to provide a rigid heat shield capable of withstanding high heat fluxes and strong acceleration and vibration forces.

Another object is to provide a method of preparing said heat shield.

Other objects and advantages of this invention will be apparent from the following description and claims.

In accordance with the present invention a foamed refractory composition is prepared by mixing a refractory grain component in the group consisting of a zircon, mullite and calcium aluminate, an alkali metal silicate binder, a complexing agent, a whipping agent, clay, refractory fibers and water. This composition is prepared in the form of a whipped, castable mixture which can be easily applied on a substrate and cured at a relatively low temperature to produce a rigid heat shield. The resulting heat shield exhibits favorable reflectance and insulating properties, and it maintains its integrity when subjected simultaneously to high heat fluxes and severe vibration and acceleration levels.

The refractory grain component can be zircon ($ZrO_2 \cdot SiO_2$), mullite ($3Al_2O_3 \cdot 2SiO_2$) or calcium aluminate ($2CaO \cdot 5Al_2O_3$), these materials being selected for their good resistance to thermal shock, low coefficient of thermal expansion and moderately low density. Zircon is preferred since it exhibits the best overall properties. This component is provided in the composition at a proportion of about 54 to 75 weight percent.

In order to obtain a suitable foamed microstructure the refractory grain component must be in finely divided form, with the bulk of this component having an average particle size less than 74 microns. The properties of the foamed product can be tailored by selection of the appropriate particle size for this component. In general the bulk of this material should have an average particle size falling within the range of 5 to 74 microns. Additions of up to 25 weight percent of this component as finer material with an average particle size less than 5 microns can be used to produce higher reflectance and better insulating efficiency, but at the expense of decreased mechanical strength. Mechanical strength can be improved by using granular material having an average particle size of 74 to 150 microns at a proportion up to 20 weight percent of this component. The relative amount of these size fractions can thus be varied depending on the reflectance and strength desired for the particular application.

The binder for the present insulating composition can be any alkali metal silicate such as sodium silicate or potassium silicate, and potassium silicate is preferred. Commercially available potassium silicates, which vary in composition from $K_2O \cdot 3.9SiO_2$ to $K_2O \cdot 3SiO_2$, can be used for this purpose. The binder is provided in an aqueous suspension which constitutes 14 to 30 weight percent of the composition. As may be seen from examples below, the silicate per se is present in the amount of from 6.9 to 8.5 weight percent. Upon being dried and cured, the binder is believed to be in the form of highly polymerized potassium silicate, its adhesive properties resulting from the reactivity of Si—O—K groups.

A complexing agent is provided in the composition at a proportion of about 1 to 3 weight percent to retard migration of the alkali metal silicate binder and to impart resistance to deterioriation by water. In the absence of a complexing agent the binder will migrate to the surface during drying and curing, resulting in a weakened foam structure with reduced surface reflectance. Alkaline earth oxides such as magnesium oxide and calcium oxide, zinc oxide and sodium silicofluoride can be used for this purpose, and sodium silicofluoride is preferred.

Although not critical, it is preferred to employ a small amount, up to 2 weight percent of clay in the insulating composition. The clay further stabilizes the foamed body, probably by acting as an extender for the thin films of silicate binder across the interconnecting pores of the foamed material. The clay also aids in maintaining the desired viscosity of the castable mixture, and it promotes easy release of water during drying and curing. Any colloidal clay such as kaolin can be used. An example of a suitable clay is the raw kaolin clay available commercially under the trade name "Ajax P."

A whipping agent is required in the composition to obtain a foamed structure. This component stabilizes the air-entrained structure produced by mechanical whipping of the mixture. Protein materials such as egg albumin and anionic surfactants such as alkyl aryl sulfonates, alkyl sulfates or metal stearates can be used, and egg albumin is preferred. The whipping agent is provided at a proportion of about 0.15 to 1.0 weight percent.

An inorganic fibrous material is provided in the composition to enhance moisture resistance, increase strength, and especially to minimize shrinkage and prevent cracking of the foamed structure during drying. The fibrous material can be any refractory filamentary product such as aluminum silicate, silicia, glass, zirconia, boron or single crystal whiskers of a refractory such as alumina or silicon carbide. The fibrous material can range in size from about 1 to 25 microns or larger in diameter and about $\frac{1}{16}$ to $\frac{1}{4}$ inch in length. A proportion of about 1.5 to 10 weight percent fibrous material can be used, with increased mechanical strength being obtained at the higher proportions in this range.

Finally, 8 to 16 weight percent additional water is employed in the starting mixture to provide a liquid medium. Including the water added as part of the silicate suspension, the total amount of water is from 23.9 to 25.7 weight percent as may be seen in the examples below. The higher proportions of water produce lower viscosities and lower densities in the mixture. A substantial portion of the water is evolved during drying and curing. The weights and proportions given above for the various components relate to the total weight of the mixture prior to removal of water.

The foamed composition of the present invention is prepared by mechanically whipping a mixture containing the components given above to produce a castable foam, shaping or applying the foam in the desired configuration and curing the resulting foamed body. In effect a thixotropic alkali metal silicate gel is foamed in the presence of the refractory grain component, the mixture is aerated with the aid of the whipping agent and the resulting foam is further stabilized and reinforced by the complexing agent, clay and fibrous material. In preparing the foamable mixture, it is preferred to first add the binder whipping agent and fibers, and then add the grain component and complexing agent while the mixture is being agitated slowly.

Foaming is carried out by mechanically whipping the mixture, a conventional eletcric mixer being suitable for this purpose. A castable foam is produced in a short period of a few minutes by using a high (for example, 900 revolutions per minute) whipping speed. The density of the produce foam can be controlled by varying the density of the castable, wet foam. Final densities from about 30 to 100 pounds per cubic foot can be obtained, with the lower densities in this range being obtained by increasing the foaming action through use of larger amounts of water and whipping agent and by whipping the mixture for a longer period.

The foamed mixture is a castable semisolid, and it can be applied readily on the substrate to be shielded by trowelling or the like. Upon being cured, the foamed mixture forms a good adhesive bond with metals or other materials so that it can be applied directly to the substrate. For maximum mechanical integrity it is preferred to apply the mixture to a honeycomb-type reinforcing structure, which in turn is brazed or otherwise attached to the substrate. The mixture shrinks less than one percent during drying and curing.

The mixture is then dried and cured to produce a rigid heat shield. Although not critical, it is preferred to use a drying and curing cycle wherein the mixture is first heated to about 115 to 140° F. and held at this temperature, and is then heated to about 240 to 260° F. at a rate dependent on specimen and size and held at the latter temperature. This procedure serves to decrease the stresses in the foam structure, which might otherwise cause cracking. A suitable curing cycle comprises heating at 115 to 140° F. increasing the temperature to 240 to 260° F. over a period of 3 to 4 hours and holding at the latter temperature for 2 to 17 hours. For small specimens the temperature can be increased rapidly, that is, within a few minutes, while for massive specimens such as are required for large rocket boosters the increase should be carried out over a much longer period of several days. Temperatures over 260° F. are to be avoided since mechanical strength would be reduced.

Improved surface properties and higher strength can be obtained by covering the mixture with a substantially moisture-impermeable film of plastic or similar material during drying and curing. This measure retards evaporation and prevents migration of the binder and formation of a hard surface skin. A partial skin effect can be produced by keeping the mixture covered during the early stages of drying and curing and uncovered later stages. The plastic film available commercially under the tradename "Saran Wrap" is suitable for this purpose. If a hard surface skin is desired, the mixture should be kept uncovered. Reflectance is slightly lower for the hard-skinned surface, probably because of decreased whiteness due to the presence of more albumin at the surface.

The insulating composition prepared as described above can be applied directly to the surface to be shielded or it can be applied to a separate surface or structure such as a honeycomb panel, which can then be strapped on or otherwise attached to the shielded surface. This invention is further illustrated by the following examples.

EXAMPLE I

A foamable refractory mixture was prepared by combining the following ingredients, in weight per cent: zircon (average particle size less than 44 microns), 55.9; zircon (average particle size less than 74 microns), 1.7; sodium silicofluoride, 1.4; aluminum silicate fibrils $\frac{1}{16}$ to $\frac{1}{4}$ inch in length by 1 to 25 microns in diameter, 5.6;

egg albumin, 0.2; water, 9.8; clay, 1.0 and potassium silicate suspension, 24.4. The potassium silicate suspension has a solids content of 35 weight percent and a $K_2O:SiO_2$ molar ratio of 1:3.3. The mixture was foamed by whipping with an electric mixer for a period of 1 to 5 minutes. The resulting foam was cast onto a 12 inch by 12 inch steel substrate and cured by heating up to a temperature of 115 to 140° F. for a period of 15 to 17 hours, increasing the temperature to 240 to 260° F. over a period of 3 to 4 hours and holding at the latter temperature for a total heating time of 39½ hours. The foam layer was then subjected to a heat flux of 40 B.t.u. per square foot per second, with simultaneous mechanical vibration of 60 cycles per second and double amplitude displacement of ½ inch, and an acceleration force of 90 $g$'s for a period of 5 minutes. The foam remained intact and maintained at a temperature of 600 to 700° F. A similar foam remained intact after three cycles under these conditions.

EXAMPLE II

A foamable mixture was prepared by combining the following ingredients, in weight percent: zircon (average particle size less than 44 microns), 46.0; zircon (average particle size less than 4 microns), 15.2; sodium silicofluoride, 2.0; aluminum silicate fibrils (⅟₁₆ to ¼ inch in length by 1 to 25 microns in diameter), 1.8; egg albumin, 1.2; water 12.2; clay, 1.2; and potassium silicate suspension of the composition given in Example I, 20.4. The mixture was foamed by whipping with an electric mixer and was cast as a ½ inch thick layer on a steel substrate and also in molds 3 by 3 by 1" in size for property measurements on cured foam blocks. The cast foam was then cured by the procedure of Example I. The foam covered substrate was subjected to the heating and mechanical conditions of Example I, the foam remaining intact and maintaining a temperature differential of about 1000° F. across the insulating layer. Thermal properties of the foam as determined by measurements of the molded blocks were as follows: density, 52 pounds per cubic foot; thermal conductivity, below 0.1 B.t.u. per hour per foot per ° F. at room temperature to 1300° F., and 0.166 and 0.290 at 1835° F., and 2300° F., respectively; and reflectance, over 90 percent in the wavelength range of 0.8 to 1.8 microns.

EXAMPLE III

A foamable mixture was prepared by combining the following ingredients, in grams; zircon (average particle size less than 44 microns, 1%+200 mesh and 10%+325 mesh), 200; zircon (average particle size less than 44 microns, 0.1%+325 mesh), 100, zircon (average particle size less than 4 microns), 100; water, 75; egg albumin, 1.4; potassium silicate suspension (35% solids content), 132; sodium silicofluoride, 16.9; clay, 8; and aluminum-silicate fibers (⅟₁₆ to ¼ inch in length and 1 to 25 microns in diameter, available commercially under the trade name "Fiberfrax"), 40. The mixture was foamed by whipping with an electric mixer at a maximum speed of approximately 920 r.p.m. for 2 to 3 minutes. The foamed mixture was then cast as a ½ inch thick layer on 3" by 6" and 9" by 9" honeycomb panel structures consisting of 10 mil-thick face sheets, a one-inch thick honeycomb core having ¼ inch square cell openings, and a 190-mil-thick honeycomb core having ½ inch square cell openings brazed to one face of the basic honeycomb structure. Thermocouples were placed at the foam-substrate interface and at the bottom of the honeycomb. The foam was cured by the procedure of Example I. In some cases a plastic film was placed over the foam surface during curing to prevent formation of a surface skin.

The foam-shielded honeycomb structure were then subjected to simultaneous heating with a radiant heat source providing a heat flux of 40 B.t.u. per square foot per second and mechanical vibration and acceleration forces of 60 cycles per second with a double amplitude displacement of ½ inch and 90 $g$'s respectively. Two of the foamed structures which had no surface skin (because of the use of a plastic covering during curing) showed foam-substrate interface temperatures of 470 and 468° F. after 300 seconds. The temperature below the honeycomb panel for these samples were 280° and 298°, respectively. A sample with a partial skin the foam surface having been covered during a portion of the curing cycle, showed an interface temperature of 590° F. and a temperature of 315° below the honeycomb. A sample having a hard surface skin, the foam being uncovered during curing, showed corresponding temperatures of 750 and 395° F. The foamed structures remained intact in each case; however, small cracks developed in the sample having a hard surface skin. The foam density in each case was 60 pounds per cubic foot.

The above examples are merely illustrative and are not to be understood as limiting the scope of the invention, which is limited only as indicated by the appended claims.

What is claimed is:

1. An insulating composition capable of being foamed and applied to a substrate and of forming thereon a rigid heat shield consisting essentially of, in weight percent:
   (a) a finely divided refractory grain component in the group consisting of zircon, mullite and calcium aluminate, 54 to 75;
   (b) potassium silicate having a $K_2O:SiO_2$ molar ratio of 1:3.9 to 1:3, 6.9 to 8.5;
   (c) a complexing agent in the group consisting of alkaline earth oxides, zinc oxide and sodium silicofluoride, 1 to 3;
   (d) refractory fibers, 1.5 to 10;
   (e) water, 23.9 to 25.7;
   (f) a whipping agent in the group consisting of egg albumin and anionic surfactants, 0.15 to 1.0; and
   (g) clay, 0 to 2.

2. The composition of claim 1 wherein said refractory grain component is zircon.

3. The composition of claim 2 wherein the average particle size of the bulk of said zircon is in the range of 5 to 74 microns.

4. The composition of claim 3 wherein said potassium silicate has a $K_2O:SiO_2$ molar ratio of 1:3.3.

5. The composition of claim 4 wherein said complexing agent is sodium silicofluoride.

6. The composition of claim 5 wherein said whipping agent is egg albumin.

7. The composition of claim 1 wherein the amount of clay is about 2 percent.

8. The method of preparing a foamed refractory heat shield which comprises mixing a composition consisting essentially of the following ingredients, in weight percent:
   (a) a finely divided refractory grain component in the group consisting of zircon, mullite and calcium aluminate, 54 to 75;
   (b) potassium silicate having a $K_2O:SiO_2$ molar ratio of 1:3.9 to 1:3, 6.9 to 8.5;
   (c) a complexing agent in the group consisting of alkaline earth oxides, zinc oxide and sodium silicofluoride, 1 to 3;
   (d) refractory fibers, 1.5 to 10;
   (e) water, 23.9 to 25.7; and
   (f) a whipping agent in the group consisting of egg albumin and anionic surfactants, 0.15 to 1.0, whipping the resulting mixture whereby a costable foam is produced, applying said foam as a layer on a substrate, and curing the applied layer at a temperature of 115° F. to 260° F.

9. The method of claim 8 wherein said layer is covered with a layer of a substantially moisture impermeable film during at least a portion of the time when said layer is being cured.

10. The method of claim 8 wherein said layer is cured by first heating to a temperature of about 115 to 140° F. for a period of about 15 to 17 hours and then heating to a temperature of about 240 to 260° F. for a period of about 2 to 17 hours.

References Cited

UNITED STATES PATENTS

| | | | |
|---|---|---|---|
| 3,419,495 | 12/1968 | Weldes et al. | 252—62 |
| 3,413,132 | 11/1968 | Fishwick | 106—40 |
| 3,285,757 | 11/1966 | Cornely | 106—57 |
| 3,203,813 | 8/1965 | Gajardo et al. | 106—40 |
| 3,150,989 | 9/1964 | Parsons | 106—40 |
| 3,062,669 | 11/1962 | Dilnot | 106—87 |
| 3,041,190 | 6/1962 | Griffith et al. | 106—40 |
| 2,880,097 | 3/1959 | Emhiser | 106—57 |

TOBIAS E. LEVOW, Primary Examiner

W. T. SCOTT, Assistant Examiner

U.S. Cl. X.R.

106—40, 64, 75, 88, 104